May 7, 1968     W. R. COFFMAN     3,381,699
WATER TREATMENT APPARATUS
Filed Oct. 22, 1965
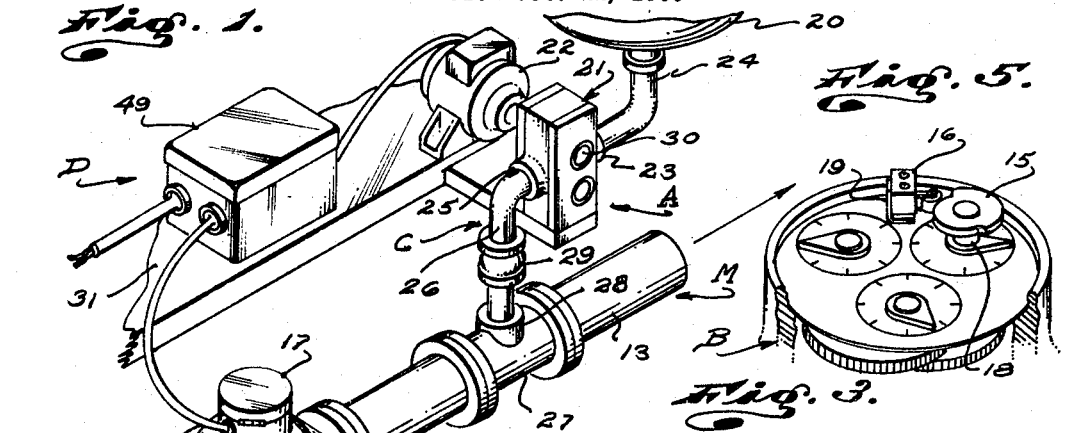
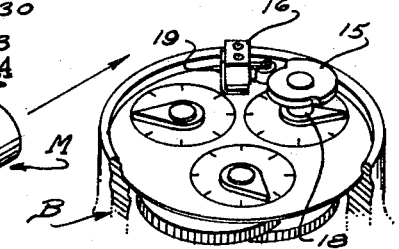
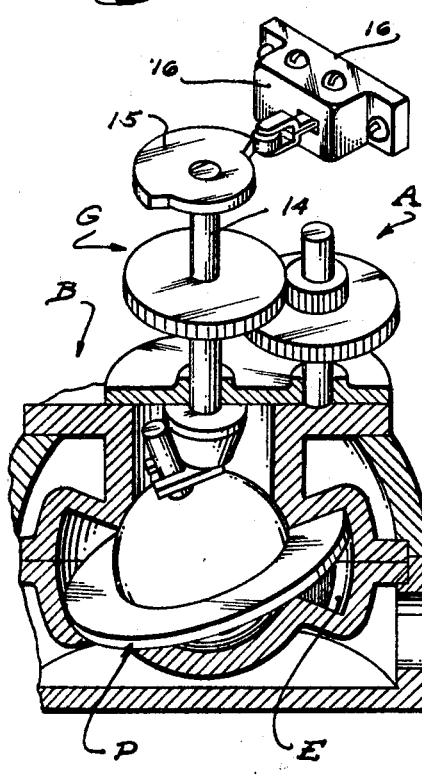
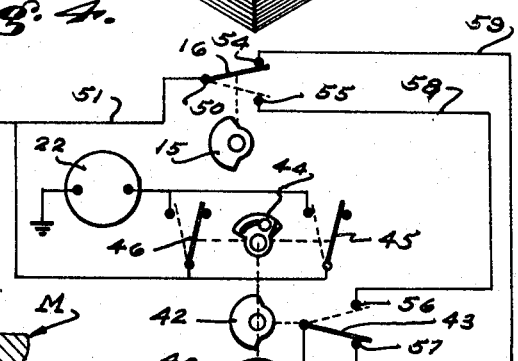
Inventor
Wilson R. Coffman
By
George A. Maxwell
Attorney

United States Patent Office 3,381,699
Patented May 7, 1968

3,381,699
WATER TREATMENT APPARATUS
Wilson R. Coffman, 15820 Lashburn St.,
Whittier, Calif. 90603
Filed Oct. 22, 1965, Ser. No. 500,589
9 Claims. (Cl. 137—101.21)

This invention relates to an improved water treatment apparatus and is more particularly concerned with an apparatus for introducing predetermined volume of chemicals into a stream of water flowing through a main.

Throughout industry, great volumes of water are used. The water is ordinarily conducted to its destination or station of use through large diameter pipes or mains, at predetermined or constant pressures.

It is further common practice to treat the water with chemicals to prepare it for its intended use. For example, chlorine and other chemicals are injected into the flow stream to render it hygienically usable and acid or alkaline compounds are injected to control the pH of the water.

Many types and forms of water treatment apparatus, which are serviceable to introduce predetermined volumes of treatment chemicals into a water supply, have been provided by the prior art. Some of such apparatus have been extremely simple and primitive in nature, such as gravity fed drip feeds, or have been extremely complicated and such that a constant flow of chemical is introduced into the water stream or main at a metered rate or volume, controlled by a rate or volume of water flowing.

The simple type of water treatment apparatus are only suitable in situations where control and/or tolerances are very loose and the water is in open bodies, such as lakes, ponds and the like. As a result, such simple or primitive apparatus have found limited use.

The more complicated and sophisticated water treatment apparatus provided by the prior art are suitable for wide application and are generally such that they are adapted to compensate for several special and variable factors, such as intermittent and variable rates of flow, variations in pressure and the like. Such apparatus are complicated and costly to manufacture, install and maintain.

There are many situations where the use of the available simple or primitive means of metering and injecting chemicals into a stream of water are not suitable and where the use of the more sophisticated apparatus "over-equip" and require an excessive expenditure of money for installation and maintenance.

The most common water treatment situation where the use of the ordinary water treatment apparatus is not required, but where the simple methods are not suitable, is where the water to be treated is conducted through a main in batches of predetermined volume, or is conducted for predetermined periods of time and at a constant head. For instance, where large storage tanks are periodically filled.

In such situations, it is not necessary that the chemical additives be metered into the stream of water, continuously and in direct predetermined proportion of the rate or volume of flow.

It is an object of my invention to provide a water treatment apparatus for introducing chemicals into a water main which is extremely simple in construction and which is both highly effective and dependable in operation.

It is an object of the present invention to provide an apparatus of the character referred to which is such that the chemical additives are intermittently introduced into the stream of water, in predetermined volumes and in predetermined ratio or proportion to the volume of water flowing by the apparatus.

It is an object of my invention to provide a simple, trouble free, effective apparatus of the character referred to which is such that it can be produced, installed and maintained at a small fraction of the cost for producing, installing and maintaining ordinary, commercially available water treatment apparatus.

It is a feature of my invention to provide an apparatus of the character referred to which includes a water meter engageable in a water main, an electric pump between and connected with the water main and a chemical supply, and cam operated switching means driven by the meter and operable to intermittently energize the pump to introduce predetermined volumes of water treatment chemicals into the main, in direct proportion to the volumes of water flowed through the main.

The various objects and features of my invention set forth above and other objects and features of the invention, will be fully understood from the following detailed description of a typical preferred form and application of my invention, throughout which description reference is made to the accompanying drawings, in which:

FIG. 1 is an isometric view of my new apparatus and showing it related to a water main;

FIG. 2 is an isometric view of a portion of the apparatus that I provide;

FIG. 3 is an isometric view of another portion of my new apparatus;

FIG. 4 is a circuit diagram of my new apparatus; and

FIG. 5 is an isometric view showing a portion of another form of my invention.

The apparatus A that I provide and which is illustrated in the drawings is adapted to be related to a water main M, through which water is flowed at a constant head, continuously or intermittently in predetermined volumes.

The apparatus A includes generally a water meter B engaging the main M, chemical injection means C to introduce desired chemical additives into the main and control means D operatively related to the meter B and the means C.

The meter B can be of any suitable design and construction and in the case illustrated is shown as including a housing H having flanged inlet and outlet fittings or ports 10 and 11 connected with opposing sections 12 and 13 of the main M. A measuring chamber E is arranged within the housing H and a wobble plate type piston P is arranged within the measuring chamber. The piston P drives a reduction gear train G. The output shaft 14 of the gear train G carries a cam 15, which cam engages a switch 16 of the control means D, as will hereinafter be described.

The gear train G, cam 15 and switch 16 can be, as illustrated in FIG. 1 of the drawings, arranged within a closure sealed compartment 17 formed integrally with the housing H.

It is to be understood that in practice an intermediate gear train can be provided and that any suitable water meter construction can be employed.

In practice, the cam 15 can be related to a standard dial type meter register, as illustrated in FIG. 5 of the drawings. In this form of the invention, an extension 18 is applied to a selected one of the dial shafts. The cam 15 is fixed to the extension 18 and the switch 16 is fixed to the dial panel by means of a suitable bracket 19.

The means C that I provide includes a source or supply of liquid chemical additive, such as a reservoir 20, a pump 21 and a prime mover 22 for the pump. The inlet side 23 of the pump is connected with the reservoir 20 by a pipe 24 and the outlet side 25 of the pump is connected with the main M by a delivery pipe 26.

In the case illustrated, a flanged sub 27 is arranged in the main M, downstream of the meter B, which sub is provided with a fitting 28 with which the delivery pipe 26 is connected.

The means C is shown as further including a check valve 29 in the line 26 to prevent reverse flow of fluid, from the main M through the pump 21 and into the reservoir 20, when the pump is idle.

The pump 21 is such that it delivers fluid at a predetermined constant volume and at a pressure which is in excess of the head pressure in the main M, so that the chemical additive can be advantageously introduced into the flow stream in the main.

The diameter of the delivery line 26 can be varied to beam or control the volume of chemical additive delivered by the pump into the main, or, if desired, the flow beam (not shown) can be arranged in the line 26.

The prime mover 22 is shown as an ordinary electric motor and is connected with the drive shaft 30 of the pump.

The motor and pump can be supported in any suitable or desired manner. For example, they can be supported by a suitable shelf structure 31 arranged adjacent the main M.

The means E that I provide includes an electric clock motor 40, the output shaft 41 of which is provided with and carries a first cam 42 which cam is adapted to actuate a cut-off switch 43 and a second cam 44, which cam is adapted to actuate a pair of pump motor control switches 45 and 46.

The output shaft 41 of the clock motor can be driven by or through a suitable reduction gear train 48, in accordance with common practice and as illustrated in the drawings.

The motor 40, gear train 48, shaft 41, cams 42 and 44, and the switches 43, 45 and 46 are arranged within a suitable box or housing 49, which housing, like the pump 21 and the motor 22, can be supported on the shelf 31.

Referring to the circuit diagram in FIG. 4 of the drawings, the common terminal 50 of switch 16, which switch is under control of the water meter driven cam 15 and which will hereinafter be referred to as the meter switch, is connected with a power supply line 51. The common terminal of the cut-off switch 43 is connected with the clock 40 by line 53. The normally closed and normally open contacts 54 and 55 of switch 16 are connected with the normally closed and normally open contacts 56 and 57 of switch 43 by lines 58 and 59, respectively.

The meter driven cam 15 is such that contact is established and maintained between the common terminal 50 and the normally closed contact 54 through one-half of one revolution of the cam and contact is established and maintained between the common terminal and the normally open contact through the other one-half of each revolution of the cam.

The cam, through or by means of the reduction gear train and/or the register mechanism, can be made to make one complete revolution for any desired, predetermined volume of water conducted through the main M.

The first cam 42, hereinafter referred to as the clock motor cam, is such that contact is established and maintained between the common terminal 52 and the normally closed contact 56 of the cut-off switch 43 through one-half of one revolution of the cam 42 and contact is established and maintained between the common terminal and the normally open contact 57 through the other one-half of each revolution of the cam 42.

The clock motor is grounded as at 60 and is such that the clock motor cam 42 is driven at a faster rate than is the water meter cam 15.

With the structure thus far described, it will be apparent that when contact, at switch 16 is initially established with the normally closed contact 54, and contact is established with the normally closed contact 56 of the cut-off switch 43, the clock motor is energized and cam 42 is rotated 180 degrees, whereupon contact with the normally closed contact 56 of switch 43 is broken and contact with the normally open contact 57 thereof is established. This actuation of switch 43 breaks the circuit to the clock motor and the motor is stopped.

Upon 180 degrees rotation of the meter cam 15, contact with the normally closed contact 54 of switch 16 is broken and contact with the normally open contact 55 thereof is established, thereby energizing the clock motor 40 until the clock motor cam 42 rotates another 180 degrees and resets switch 43 as initially set forth above.

Accordingly, it will be apparent that the clock motor is energized for a predetermined period through each 180 degrees of rotation of the water meter cam 15.

The pump motor 22 is supplied with current through a secondary power line 51' and is suitably grounded as at 61.

The pump motor control switch 45 is arranged at the side of the second or pump cam 44 and has its primary terminal 62 connected with the power line 51', its primary contact 61 connected with line 64 extending to the pump motor 22 and its secondary contact dead.

The switch 45 is normally open and is adapted to be closed for predetermined periods through each 180 degrees of rotation of the cam 44, which, as will be noted, rotates with and at the same rate and to the same extent as the clock motor cam 42.

The circumferential extent of the switch closing lobe of cam 44 can be varied between plus zero degrees and minus 180 degrees, as circumstances require. Such variations can be accomplished by substituting special cams or cam, as illustrated in the drawings, be accomplished by providing a suitable adjustable cam construction involving a pair of relatively shiftable quadrates adapted to be releasably secured in fixed relationship to each other by a suitable set screw.

With the construction set forth above, it will be apparent that the pump motor is intermittently energized and the chemical additive is pumped at predetermined pressure and for predetermined periods of time, into the main M, to mix with and disburse in the water flowing therethrough, under a constant head.

In practice, if the water flow is constant or uninterrupted, the pump will be energized and the additive introduced into the flow stream at regular, predetermined periods and in predetermined volumes. If the flow of water is intermittent and each time flow is commenced, a predetermined volume of water is delivered, as in a batching process, the apparatus that I provide can be set and adjusted so that the chemical additive is introduced into each batch or volume of water conducted through the main, in one or more predetermined volumetric batches or doses, as circumstances required or as desired.

From the foregoing, it will be apparent that I have invented an extremely simple, easy and economical to manufacture, install and maintain, water treatment apparatus, which apparatus is both highly effective and dependable in operation.

Having described only a typical preferred form and application of my invention, I do not wish to be limited or restricted to the specific details herein set forth, but wish to reserve to myself any modifications or variations that may appear to those skilled in the art and which fall within the scope of the following claims.

Having described my invention, I claim:

1. An apparatus adapted to introduce predetermined volumes of liquid chemical additive into a stream of water flowing through a main including, a water meter arranged in the main to measure the volume of water flowing therethrough, cam operated switch means driven by the meter and connected with a power source and with a pair of power lines, said switch means shiftable into and out of contact with each of the power lines for equal periods of time, a cut-off switch connected with said power lines and with a clock motor, a first cam driven by the clock motor at a rate faster than the cam operated switch means and adapted to shift contact in the cut-off switch from one of the power lines to the other of said power lines after the clock motor has operated a predetermined period of time, a second cam driven by the clock motor each time one of the power lines is contacted at the first mentioned switch, normally open switch means connected with the power source and with a pump motor and related to the second cam, said second cam adapted to close the switch means to energize the pump motor for a predetermined period of time during each period when the clock motor is energized, and a pump arranged between and connected with the main and a chemical supply and driven by the pump motor.

2. A water treatment apparatus for introducing liquid chemicals into a stream of water flowing through a main including, a water meter arranged in the main and having a driven shaft excessible at the exterior of the meter, chemical injecting means including a supply of liquid chemical and a motor driven pump between and connected with said supply and the main and control means related to the meter and the injecting means and including, a water meter switch with a primary terminal connected with a power source and first and second contacts, a cam on the driven shaft to operate said meter switch to establish contact with the primary contact through 180 degrees rotation of the driven shaft and to establish contact with the secondary contact through the other 180 degrees rotation of the shaft, a cut-off switch having primary and secondary contacts connected with the primary and secondary contacts of the meter switch and having a primary terminal, a clock motor with a second driven shaft and operable at a faster rate than the meter shaft, said primary terminal of the cut-off switch connected with the clock motor, a first cam on the second driven shaft to operate the cut-off switch to establish contact with the primary contact thereof through 180 degrees rotation of the second driven shaft and to establish contact with the secondary contact thereof through the other 180 degrees rotation of the second driven shaft and to thereby energize the clock motor to effect 180 degrees rotation of the second driven shaft during each 180 degrees rotation of the meter shaft, a second cam on the second driven shaft with a segment lobe of less than 180 degrees, a pair of normally open, control switches arranged at diametrically opposite sides of the second cam to be intermittently closed thereby upon each 180 degrees rotation of the second driven shaft and for predetermined periods of time, each control switch having one side connected with the power source and its other side connected with the pump motor.

3. An apparatus as set forth in claim 2 which further includes a check valve between the pump and the main to prevent the flow of water from the main through the pump and into the chemical supply when the pump is idle.

4. An apparatus as set forth in claim 2 wherein said second cam includes a first segment fixed to the second driven shaft, a second segment arranged adjacent and shiftable circumferentially relative to the first segment, one of said segments having an arcuate slot to accommodate a set screw carried by the other segment and operable to hold the segments in predetermined set relative rotative positions.

5. An apparatus as set forth in claim 2 wherein said second cam includes a first segment fixed to the second driven shaft, a second segment arranged adjacent and shiftable circumferentially relative to the first segment, one of said segments having an arcuate slot to accommodate a set screw carried by the other segment and operable to hold the segments in predetermined set relative rotative positions, said apparatus further including a check valve between the pump and the main to prevent the flow of water from the main through the pump and into the chemical supply, when the pump is idle.

6. An apparatus as set forth in claim 2 wherein said driven shaft of the meter is a selected one of several dial indicator shafts of a gear train driven meter register.

7. An apparatus as set forth in claim 2 wherein said driven shaft of the meter is a selected one of several dial indicator shafts of a gear train driven meter register, said second cam on the second driven shaft including a first segment fixed to the drive shaft, a second segment arranged adjacent and shiftable circumferentially relative to the first segment, one of the said segments having an arcuate slot to accommodate a set screw carried by the other segment and adapted to hold the segments in predetermined set relative rotative positions.

8. An apparatus as set forth in claim 2 wherein said driven shaft of the meter is a selected one of several dial indicator shafts of a gear train driven meter register, said apparatus further including a check valve between the pump and the main to prevent the flow of water from the main through the pump and into the chemical supply, when the pump is idle.

9. An apparatus as set forth in claim 2 wherein said driven shaft of the meter is a selected one of several dial indicator shafts of a gear train driven meter register, said second cam on the second driven shaft including a first segment fixed to the second driven shaft, a second segment arranged adjacent and shiftable circumferentially relative to the first segment, one of the said segments having an arcuate slot to accommodate a set screw carried by the other segment and adapted to hold the segments in predetermined set relative rotative positions, said apparatus further including a check valve between the pump and the main to prevent the flow of water from the main through the pump and into the chemical supply, when the pump is idle.

References Cited

UNITED STATES PATENTS 2,280,656  4/1942  McCoy _____ 137—101.21

WILLIAM F. O'DEA, *Primary Examiner.*

H. M. COHN, *Assistant Examiner.*